3,300,425
HALOGEN-CONTAINING THERMOPLASTIC COMPOSITIONS FOR THE PRODUCTION OF CURED PRODUCTS SUITABLE FOR ARTIFICIAL LEATHERS, SHEETS, COATINGS AND IMPREGNATIONS
Rudolf Nagelschmidt, Hanau am Main, and Max Goecke, Bad Homburg vor der Hohe, Germany, assignors to Deutsche Gold- und Silber-Scheideanstalt vormals Roessler, Frankfurt am Main, Germany
No Drawing. Filed Apr. 6, 1964, Ser. No. 357,770
Claims priority, application Germany, Mar. 3, 1959, D 30,103, D 30,105
5 Claims. (Cl. 260—29.1)

This application is a continuation-in-part of application Serial No. 12,514, filed March 3, 1960, now abandoned.

The present invention relates to a composition of matter for the production of artificial leather, sheets, coatings, impregnations and the like, which are distinguished by their high resistance to tearing and their good adhesion.

Coating masses for the production of artificial leathers have long been known which essentially consist of halogen-containing synthetic rubbers and vulcanizing agents and, if desired, plasticizers, dyes or fillers, or which consist of plasticizer containing polyvinyl compounds, such as polyvinyl chloride and dyes or fillers.

It is known that shaped structures of good mechanical properties and thermal stability can be prepared from thermoplastic vinyl polymers such as homopolymers of vinyl chloride and vinylidene chloride or copolymers of vinyl chloride or vinylidene chloride with other monomers. When such vinyl polymers are mixed with plasticizers, such as dioctyl phthalate, dioctyl adipate, tricresyl phosphate and others and the mixtures caused to gel at elevated temperature, thermoplastic masses are obtained from which, for example, shaped structures of a most varied type, for instance, sheets, tubes, synthetic leather, can be produced. While such shaped bodies possess a certain elasticity and certain valuable mechanical properties, such properties are to a far reaching degree dependent on the temperature concerned. Such properties, for example, disappear completely or to a great degree at raised temperatures of, for instance, 100° C. so that such properties cannot be compared with those of vulcanized rubber. For instance, the elasticity of gelled plasticizer containing polyvinyl chloride cannot be considered equivalent to that of vulcanized rubber as shaped structures of the un-cross-linked gelled plasticized polyvinyl chloride are and remain thermoplastic.

Many attempts have been made to reduce or eliminate the thermoplasticity of the thermoplastic polymers based on halogen containing polyvinyl compounds, such as, for instance, the well known polyvinyl chloride. The procedures which previously have been developed, however, have not led to practically usable products or have achieved only very minor significance.

It also is known that resins based on polyvinyl and polyvinylidene chloride can be treated with alkylene polyamines of the formula $H_2N—(CR_2—CR_2—NH)_n—H$ in which R is hydrogen or alkyl of 1–3 carbon atoms. However, such treatment caused a strong dark coloration of the products which indicates the lack of stability of such products. In addition the velocity of the reaction when pure polyamines are employed is too fast for commercial practice of such process.

It is also known that reaction products of diamines and ketones can be employed as vulcanizing agents for types of natural and synthetic rubbers. It is furthermore known that di- and tri-isocyanates can be used as cross-linking agents for polymeric organic substances. In these cross-linking reactions, as is well known, the isocyanate group acts, especially easily, on all OH groups contained in the polymers whereby the cross-linking of the polymers with the polyisocyanates is effected.

The compositions according to the invention possess useful and more valuable properties, which essentially differ from those of plastic compositions which only contain di- or tri-isocyanates or which only contain condensation products of diamines and ketones. In view of the combined use according to the invention of at least two cross-linking or vulcanizing agents, none of which are new per se, an unexpected synergistic action is obtained. The compositions according to the invention upon heating yield cross-linked polymers with surprisingly high tear strength and excellent elongation properties, the latter also form polymers, such as polyvinyl chloride, usually designated as thermoplastic. The good adhesion of the cross-linked polymers attained according to the invention to bases, such as textile fabrics, is of special significance in the production of artificial leathers. The good adhesion attained with the cross-linked polymers according to the invention is especially noticeable with polyamide and polyester fabrics which in themselves usually engender poor adhesion.

The compositions of matter according to the invention which are especially well adapted for the production of artificial leathers, sheets, coatings, impregnations and the like, essentially consist of a thermoplastic polymer containing halogen bound in its molecule selected from the group consisting of polymers which contain chlorine or fluorine or both chlorine and fluorine, 0.01 to 8% by weight of an oligo isocyanate and 0.01 to 15% by weight of at least one compound selected from the group consisting of oligo Schiff's bases, oligo methylols of oligo amines with as an average not more than one methylol group bound to one amino nitrogen atom and oligo methylols of oligo carboxylic acid amides with as an average not more than one methylol group on one amido nitrogen atom.

The amines which can be converted to Schiff's bases by condensation with carbonyl compounds have the following general formula:

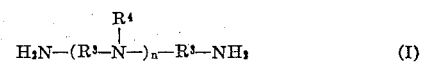      (I)

The amines which can be converted to the oligo methylols have the following general formula:

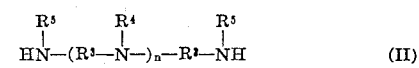      (II)

The oligo carboxylic acid amides which can be converted to the oligo methylols have the following general formula:

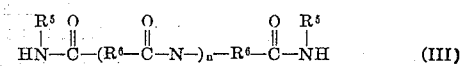      (III)

In such formulae:

$n$ is a whole number of 1–12 or 0

$R^3$ is (a) alkylene of 2 to 18 carbon atoms
(b) cycloalkylene of 5 to 18 carbon atoms
(c) mixed aromatic aliphatic radicals of the sequence alkylene-arylene-alkylene of 8 to 24 carbon atoms
(d) divalent heterocyclic radicals of 2 to 14 carbon atoms and at least one hetero element selected from the group consisting of oxygen, divalent sulfur, =N— and

and
(e) radicals derived from alkylene or cycloalkylene of 2 to 18 carbon atoms whose carbon chains are interrupted at least once by a hetero element selected from the group consisting of oxygen, divalent sulfur, =N— and

and/or whose hydrogen atoms are substituted by one or more groups selected from the group consisting of alkyl of up to 12 carbon atoms, —OH, —C$_6$H$_5$, —C≡N, —NH$_2$ and —R$^{3'}$—NH$_2$ (R$^{3'}$ having the same significance as R$^3$ for (a), (b), (c) and (d))

R$^4$ is hydrogen, alkyl of 1–18 carbon atoms and the grouping —R$^{3'}$—NH—R$^5$ R$^5$ is hydrogen or alkyl of 1 to 18 carbon atoms R$^6$ has the same significance as R$^3$ for (a), (b) and (c) and in addition can signify methylene and in addition up to 3 carbon atoms of R$^6$ can carry a —CONHR$^5$ group.

The prefix "oligo" is employed herein in connection with the cross-linking agents used according to the invention which are of lower molecular weight than compounds of macromolecular chemistry as in macromolecular polymers (see Webster's Collegiate Dictionary, 5th Ed., G. & C. Merriam Co., 1937). The prefix "oligo" therefore is used herein to signify a "few" as contrasted to many and in fact numbers of the order of 2–5. Preferably, the di- or tri-functional isocyanates, methylols and Schiff's bases are employed according to the invention as such di- and tri-functional compounds in most instances provide a sufficient and very good cross-linking or respectively vulcanization of the starting polymers. However, if a more far reaching and sturdy cross-linking is desired tetra and penta functional compounds can be used. The terms oligo isocyanates, oligo methylols and oligo Schiff's bases are used herein to signify isocyanates containing 2 to 5 functional —N=C=O groups, methylols containing 2 to 5 —CH$_2$OH groups and Schiff's bases containing 2 to 5 >C=N— groups.

As has already been indicated above, the essence of the present invention resides in the discovery that a synergistic action is obtained by the simultaneous combined use of oligo isocyanates and at least one substance selected from the group consisting of oligo methylols and oligo Schiff's bases in the curing of halogen containing thermoplastic polymers.

Among the starting polymers, that is, the thermoplastic polymers having halogen bound in the molecule, which can be employed for the compositions according to the invention, the homopolymers of vinyl chloride, vinylidene chloride, 1- and 2-chlorobutadiene, tetrafluoroethylene, monofluorotrichloroethylene, trifluoroethylene, trifluoropropylene, dichloro difluoro ethylene, difluoro chloro ethylene and other known halogen-containing ethylenically unsaturated or vinyl type monomers are preferred. Chlorosulfonated polyethylene, chlorosulfonated polypropylene and the analogously constructed polymeric derivatives, as well as chlorinated rubber also are suitable halogen containing thermoplastic polymers. Furthermore, copolymers of at least 20% by weight of the above mentioned mono or poly ethylenically unsaturated or vinyl type monomers containing at least one halogen atom with up to 80% by weight of other comonomers copolymerizable therewith are also suitable.

The copolymers of vinyl chloride with vinylidene chloride come within a special category among the copolymers, as is easily understood, as both components are cross-linkable. In addition, it is not out of the question that other comonomers which contain one or two ethylenically unsaturated bonds may coact chemically in the cross-linking reaction so that the effects attainable with low quantities of cross-linkable vinyl chloride or vinylidene chloride components in such copolymers can also lead to definitely discernable effects. Suitable comonomers, for example, are other vinyl or vinylidene halides, such as the fluorides or bromides, vinyl esters, such as vinyl acetate, vinyl propionate, vinyl bromopropionate, vinyl alcohols, such as vinyl methyl-, vinyl ethyl-, vinyl propyl alcohols or vinyl higher aliphatic alcohols, vinyl ethers, such as vinyl methyl-, vinyl ethyl-, vinyl butyl-, vinyl isobutyl ethers, vinyl thioethers, vinyl amine, vinyl acetylene, divinyl acetylene, vinyl alkyl ketones with C$_1$ to C$_4$ alkyl groups, acrylic acid, acrylic acid alkyl esters, such as methyl, ethyl, propyl and other alkyl esters, methacrylic acid, methacrylic acid lower alkyl esters, acrylonitrile, asymmetric dicyanethylene, styrene, mono- or polyunsaturated hydrocarbons, such as ethylene, propylene, butadiene, 2-chlorobutadiene, isoprene, isobutylene, maleic acid and fumaric acid alkyl diesters, such as the dimethyl, diethyl and homologous higher diesters, acetic acid vinyl esters, esters of unsaturated alcohols with, if desired, unsaturated dicarboxylic acids, such as maleic acid diallyl ester and the like.

Examples of several well suited copolymers for the compositions according to the invention are as follows:

Vinyl chloride-(90)-vinyl acetate-(10)
Vinyl chloride-(80)-vinyl acetate-(20)
Vinyl chloride-(60)-vinyl acetate-(40)
Vinyl chloride-(20)-vinyl acetate-(80)
Vinyl chloride-(95)-vinylidene chloride-(5)
Vinyl chloride-(80)-vinylidene chloride-(20)
Vinyl chloride-(20)-vinylidene chloride-(80)
Vinyl chloride-(95)-maleic acid-(5)
Vinyl chloride-(85)-maleic acid-(15)
Vinyl chloride-(95)-maleic acid-diethyl ester-(5)
Vinyl chloride-(85)-maleic acid-diethyl ester-(15)
Vinyl chloride-(95)-ethylene-(5)
Methyl-methacrylate-(80)-acrylic acid-chloroacetate-(20)
Beta-chloroethyl acrylate-(10)-ethyl acrylate-(70)-octyl acrylate-(20)

(the numerals given in parentheses signify the percent by weight of the comonomeric components).

In addition, mixtures of the halogen containing polymers or copolymers mentioned with other polymers can also be successfully used for the compositions according to the invention. The quantity of the other polymers contained in such mixtures of polymers usually does not exceed that of the halogen containing homo- or copolymers present therein. Examples of such other polymers for instance are: polyamides, such as 6-polyamide (nylon-6), 11-polyamide, 6,10-polyamide and known copolymers of various polyamide forming monomers, polyolefins, such as polyethylene, polypropylene and copolymers of, for example, ethylene and propylene, polystyrene, polyesters, for instance, those of ethylene glycol and adipic acid or of ethylene glycol and terephthalic acid or phthalic acid (anhydride), rubber and synthetic rubber, such as polybutadiene, copolymers of butadiene and vinyl monomers, such as styrene, acrylic acid esters, methacrylic acid esters, acrylonitrile, asymmetric dicyanethylene and/or fumaric acid esters, also vinyl pyridine rubber, aldehyde and ketone resins, silicone rubber, also known condensation products and resins, such as polycondensation products or polyadducts.

In mixtures of the other polymers with halogen containing homopolymers, the total weight of the other polymers in such mixtures may be more than 50% by weight and depending upon the intensity of the effect desired can amount to up to 75%. However, when copolymers of halogen containing monomers with comonomers not containing halogen are concerned the quantity of other polymers concerned in the mixtures must be kept lower in order to obtain a sufficient and noticeable effect. In general, the amount of the cross-linkable halogen containing monomer components in such mixtures should at least be 25% by weight.

Of course, mixtures of two or more of the halogen containing thermoplastic polymers described above, such as of homopolymers of hexafluoropropylene and vinylidene fluoride, can also be employed for the compositions according to the invention.

Of the organic oligo isocyanates which can be employed according to the invention, the di- and tri-isocyanates are preferred. Suitable organic oligo isocyanates, for instance, are propylene-1,2-diisocyanate, toluylene diisocyanate, triphenyl methane triisocyanate, methylene-bis-(4-phenyl-isocyanate), methylene-bis-(4-xylyl-isocyanate), naphthalene diisocyanate, para-phenylene diisothiocyanate, para-phenylene diisocyanate, hexamethylene diisocyanate, ethylene diisocyanate, phloroglucinol triisocyanate, as well as many others such as those additionally listed in British Patents Nos. 574,901 and 790,856, as well as U.S. Patent No. 2,430,479.

Schiff's bases are reaction products of primary amines and ketones or aldehydes and in such reactions the reaction essentially occurs between the primary amino groups of the amine and the carbonyl group of the ketones or aldehydes. Therefore, the Schiff's bases concerned according to the invention must contain the grouping (Ia) 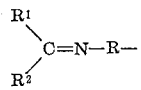

at least twice. In such grouping the trivalent organic radical =N—R— is derived from the amine and the bivalent organic radical

is derived from the ketone or aldehyde, both $R^1$ and $R^2$ in the case of a ketone being organic radicals and $R^2$ being hydrogen and $R^1$ being hydrogen or an organic radical in the case of an aldehyde. Schiff's bases which include such a grouping (Ib) $>C=N—$ are well known in the literature. In this connection reference is made to:

Chemische Berichte, 54 (1921), page 3132
Chemical Review, 26 (1940), page 297
Houben-Weyl-Müller, 7, vol. 1, page 453 (1954)
Krauch and Kunz, "Namensreaktionen der organischen Chemie," Dr. Hüthig-Verlag, Heidelberg, 1961, section entitled, "Schiff'sche Basen."

The Schiff's bases which are employed according to the invention must contain at least two $>C=N—$ groups in their molecule so that in their later reaction with the vinyl chloride and/or vinylidene chloride polymers a shaped structure can be produced which has the useful properties described above and in order that the molecules of the polymers are cross-linked.

The $>C=N—$ groups of the Schiff's bases are very reactive and such reactivity is influenced by the radical R derived from the amine and the radicals $R^1$ and $R^2$ derived from the aldehyde or ketone (see Formula Ia). It was found that aromatic radicals which are directly bound on the nitrogen atom of the grouping $>C=N—$ have an unfavorable effect upon the properties of the end products as the end products produced with such aromatic Schiff's bases are strongly discolored. Such aromatic Schiff's bases, furthermore, are excluded from the scope of this invention as it was found that Schiff's bases with aliphatic or cycloaliphatic radicals directly bound to the nitrogen atom of the grouping $>C=N—$ have considerably more favorable activity and do not cause as intensive discoloration of the end products. Schiff's bases in which the radical on the nitrogen atom of the grouping $>C=N—$ is an aliphatic-aromatic radical of the sequence alkylene-arylene-alkylene or alkylene with an aromatic radical as a branch element have been found still to be sufficient with regard to their reactivity and lower discoloration of the end products.

The Schiff's bases containing at least two $>C=N—$ groups as has already been indicated are prepared from polyamines containing at least two primary amino groups of general Formula I.

The grouping —N=C< is also known as the carbimino group or when derived from an aldehyde as the aldimine or azomethine group or when derived from a ketone as the ketimine group.

Polyamines of general Formula I, for example, are ethylene diamine, propylene diamine, butylene diamine, pentamethylene diamine, hexamethylene diamine and homologous higher alkylene diamines with a carbon chain of up to 18 carbon atoms, diethylene triamine, triethylene tetramine, tetraethylene pentamine and the like, 1,4-dicyclohexyl triamine, C-tetraphenyl diethylene triamine, imino-bis[1 - nitrilo-2-phenylethylamine], 3,4-dihydroxy hexamethylene diamine, N″ - ethyldiethylene triamine, N″,N‴,N⁗-triethyl tetrapropylene pentamine, 3,4-dihydroxymethyl hexamethylene diamine, 1,3,6-triamino hexane, bis-(1,2-diamino)dipropylene, 3,4 - di(thiomethyl) hexamethylene diamine among the many others which are suitable for the purposes of the invention.

The $>C=$ group of the grouping $>=N—$ in the Schiff's bases employed according to the invention is derived from ketones of the formula

 (IV)

or aldehydes of the formula

 (V)

from which the Schiff's bases were formed by reaction with the primary amino groups of the polyamines. According to the invention, all ketones and aldehydes can be used as all of such compounds contain at least one reactive carbonyl group available for the formation of a Schiff's base. It is only necessary that in the formation of the Schiff's bases according to the invention a sufficient quantity of such carbonyl compounds is present to react with at least two primary amino groups contained in the polyamine reactant.

The radicals $R^1$ and $R^2$ of the aldehyde and ketone components of the Schiff's bases also influence the reactivity of the Schiff's bases in the compositions according to the invention. The reactivity of the $>C=N—$ groupings of the Schiff's bases employed according to the invention is influenced by the radicals $R^1$ and $R^2$ of Formulae IV and V in that aliphatic, olefinic, cycloaliphatic and saturated and unsaturated aliphatic aromatic radicals and therefore in general carbon chains increase the reactivity whereas aromatic radicals directly bound on the carbon atom of the grouping $>C=N—$ reduce the reactivity. The reduction in reactivity is increased even further by substituents such as, for example, —OH groups on the aromatic radical. The influence on the reactivity of the $>C=N—$ groupings therefore can be varied to a considerable degree. It is of importance for the invention that such variation in reactivity is possible and as a consequence for the purposes of the present invention radicals $R^1$ and $R^2$ cannot be limited to certain radicals as with such variability it is possible to provide the desired incubation period for any desired type of processing by a corresponding selection of the proper radicals $R^1$ and $R^2$ which influence the reaction period. The term "incubation period" is used herein to designate the period required for initiation of the cross-linking reaction measured from the time the Schiff's bases are added to the polymer components of the compositions when such Schiff's bases are added to such polymer compositions which already have been heated to reaction temperatures prior to such addition. This incubation period can be determined without difficulty in a Brabender Plastograph.

If the incubation period is too short, the reaction in practice initiates too fast to permit sufficient processing time. If, on the other hand, the incubation period is too long, the thermal requirements become too high for the vinyl or vinylidene chloride polymers.

Among the carbonyl compounds suitable for the preparation of the Schiff's bases employed according to the invention are the aliphatic, including araliphatic, compounds with up to 24 carbon atoms, the aromatic compounds with up to 24 carbon atoms in which the aromatic nuclei (phenyl and naphthyl) can be substituted with aliphatic side chains with up to 6 carbon atoms and with the groups —OH, —OCH$_3$, —OC$_2$H$_5$, —Cl and —SH, also the cycloaliphatic carbonyl compounds with or without aliphatic or aromatic substituents, especially those with 5 to 24 carbon atoms, the heterocyclic carbonyl compounds of 2 to 14 carbon atoms and at least one hetero element of the group consisting of oxygen, divalent sulfur and trivalent nitrogen, carbonyl compounds with organic radicals which represent mono or poly ethylenically unsaturated hydrocarbon chains of 2 to 10 carbon atoms interrupted by a hetero element selected from the group consisting of oxygen, divalent sulfur and trivalent nitrogen and such carbonyl compounds whose organic radicals are alkyl radicals or alkyl radicals in which some of the hydrogen atoms are replaced by —OH, =O or =S. In the case of ketones the radicals R$^1$ and R$^2$ of Formula IV can also be different so that also mixed aliphatic/aromatic/cycloaliphatic/heterocyclic ketones come into question for the production of the Schiff's bases employed according to the invention. The radicals R$^1$ and R$^2$ of the carbonyl compounds according to Formulae IV and V, however, also can be carboxyl groups, aldehyde groups and ester groups (COOR$^n$, wherein R$^n$ is alkyl of up to 4 carbon atoms and R$^m$COOR$^n$, wherein R$^m$ is alkylene with up to 4 carbon atoms). The radicals R$^1$ and R$^2$ of Formulae Ia and IV also can be a part of one and the same alicyclic or heterocyclic ring.

Illustrative of such carbonyl compounds are the aldehydes: formaldehyde, acetaldehyde, propionaldehyde, butyraldehyde and homologous aldehydes with a straight or branched chain with up to 18 carbon atoms, also unsaturated aldehydes or polyaldehydes, such as allyl aldehyde, croton aldehyde, tiglic aldehyde, citronellic aldehyde, citral, glyoxal, methyl glyoxal, succinaldehyde, levulinic aldehyde as well as aromatic aldehydes, such as benzaldehyde, cresol aldehyde, cinnamaldehyde, salicylaldehyde, anisaldehyde, as well as heterocyclic aldehydes, such as furfural, methyl furfural and hydroxy methyl furfural and hydroxy aldehydes, such as, for example, the so-called aldoses, such as bioses, trioses and the like up to hexoses, such as, for example, glucose, gluose, galactose, talose, arabinose, erythrose, glycerine aldehyde and the like.

Suitable ketones which can be transformed to the Schiff's bases employed according to the invention are: dimethyl ketone, diethyl ketone and similar ketones with up to 14 carbon atoms in the aliphatic radical. Also all corresponding ketones with two different aliphatic radicals, such as methyl ethyl ketone, methyl decyl ketone, ethyl dodecyl ketone, 4,6,8-trimethyl undecanone-2, also keto aldehydes, such as 1-formyl-cyclopentanone-2, 1-methylol-cycloheptanone-2 (α-oxymethylene suberone), mixed aliphatic aromatic ketones, such as acetophenone, ethyl phenyl ketone, propyl phenyl ketone and the like, aromatic ketones, including ketones which two or more carbonyl groups in their molecule, such as benzophenone, benzil, benzoyl acetone and the like, cyclic aliphatic ketones, such as cyclopentanone, cyclohexanone and the like, hydroxy ketones, such as p-hydroxy acetophenone, o-hydroxy benzophenone, gallobenzophenone, keto carboxylic acids and their esters, such as acetoacetic acid methyl ester, pyruvic acid, acetone dicarboxylic acid and the like.

The following oligo Schiff's bases, identified as the reaction products of their starting materials, are only a few representative illustrative examples of those suitable for the purposes of the invention: The reaction products of hexamethylene diamine and benzaldehyde, hexamethylene diamine and acetoacetic acid ester, hexamethylene diamine and glyoxal, hexamethylene diamine and cyclohexanone, tetraethylene pentamine and a mixture of cyclohexanone and methyl ethyl ketone, butylene diamine or ethylene diamine and acetophenone, 4,6,8-trimethyl-undecanone-2 and butylene diamine, ethylene diamine and crotonaldehyde, dipropylene triamine and butyraldehyde, tetraethylene pentamine and benzaldehyde, butylene diamine and acrolein, benzidine and benzaldehyde, ethylene diamine and benzaldehyde, crotonaldehyde, acetophenone, acetoacetic acid ester or cinnamicaldehyde, decamethylene diamine and benzaldehyde, dipropylene triamine and isobutyraldehyde, diethylene triamine and acetophenone or salicylaldehyde. As is known, Schiff's bases may also be prepared from nitroso compounds and such organic compounds having at least one methylene group with an active hydrogen atom. Such Schiff's bases, for example, are the reaction products of:

p,p'-dinitrosobiphenyl and acetyl acetone or p,p'-dinitrosobiphenyl and malonic acid diethyl ester.

The following oligo methylols derived from oligo amines are also only a few representative illustrative examples of those suitable for the purposes of the invention:

N,N'-dimethylol-butylene diamine,
N,N'-dimethylol-hexamethylene diamine,
N,N'-dimethylol octamethylene diamine,
N,N'-dimethylol piperazine,
diethylene-N,N',N''-trimethylol triamine,
diethylene-N,N'-dimethylol triamine,
triethylene-N,N',N'',N'''-tetramethylol-tetramine,
dipropylene-N,N'-dimethylol-triamine and the like,
3,4-dihydroxy hexamethylene-1,6-dimethylol-diamine,
N,N'-dipropionitrile-ethylene-N,N'-dimethylol-diamine,
diethylene-N,N'-diethyl-N,N',N''-trimethylol-triamine,
dipropylene-N,N',N''-trimethyl-N,N''-dimethylol-triamine,
dipropylene-N,N',N''-trimethylol-N,N''-dimethyl-triamine,
triethylene-N,N'''-dimethyl-N,N',N'',N'''-tetramethylol-tetramine,
tetraethylene-N,N''''-dimethyl-N,N',N'',N''',N''''-pentamethylol-pentamine,
pentamethylene-N,N'''''-diethyl-N,N',N'',N''',N'''',N'''''-hexamethylol-hexamine,
N-methylol-N'-phenyl-N,N'-dimethylol-decamethylene diamine,
propylene-1,3-N'-bis(methylol-N-barbituric acid),
N,N'-dimethyl-N,N'-dimethylol-hexamethylene diamine and many others.

The oligo methylols derived from oligo carboxylic acid amides of Formula III which are employed according to the invention preferably are those of Formula III in which $n=1$ and in which R$^6$ is lower alkylene such as methylene, ethylene and propylene. In addition, R$^6$ can be an alkenyl radical such as —CH=CH—. Illustrative examples of oligo methylols of oligo carboxylic acid amides are: sebacic acid-N,N'-dimethyloldiamide, adipic acid-N,N'-dimethylol-diamide, adipic acid - N,N' - dimethylol-dianilide, terephthalic acid-N,N'-dimethylol-diamide.

The quantity of cross-linking or vulcanization agents used in the compositions according to the invention can be varied within wide limits, depending upon the effect desired. In general, the quantities of oligo isocyanates employed are between about 0.01 and 8% with reference to the weight of the halogent containing polymer. In this connection, however, a certain distinction can be made between the halogen containing polymers which usually are designated as thermoplastics, a typical representative of which is polyvinyl chloride and the thermoplastic polymers which usually are converted to elastomers by vulcanizing agents. Poly-2-chlorobutadiene is a typical representative of the latter type of polymer. For the first type of halogen containing polymer the preferred quantity of oligo isocyanates amounts to about 0.1 to 5% whereas for the latter type of halogen containing polymer it preferably amounts to about 0.2 to 4% (in each instance with reference to the weight of the halogen containing polymer) in order to obtain optimum results.

The quantities of the oligo methylols and Schiff's bases when employed individually or together in general amount to about 0.01 to 15% by weight of the halogent containing polymer. Again, when the halogen containing polymer concerned is a thermoplastic of the type of polyvinyl chloride the quantities preferably are 0.1 to 6% and when the polymer concerned is of the type of poly-2-chlorobutadiene the quantities preferably are 0.2 to 4%.

Often it can be of advantage to add the usual plasticizers, softeners and heat and light stabilizers to the compositions according to the invention. The inclusion of plasticizers has proved especially advantageous when the starting polymers are of the type which are normally designated as thermoplastics, such as polyvinyl chloride, polyvinylidene chloride and vinyl chloride and/or vinylidene chloride containing copolymers. In such instances the known usual plasticizers for polyvinyl chloride can be used in quantities up to 150% by weight of the starting polymer. Heat and light stabilizers can be used in quantities up to about 8.5% by weight of the starting polymers.

Furthermore, known vulcanizing agents, such as sulfur and/or organic sulfur compounds, can in some instances be added with advantage to the compositions according to the invention. The organic sulfur compounds concerned are such known sulfur containing organic compounds which are commonly called vulcanizing agents or accelerators in the rubber industry, such as those of the thiuram, thiocarbamide and xanthate types. The quantities employed can be between about 0.1 and 4% by weight with reference to the halogen containing starting polymer. Preferably such sulfur and/or organic sulfur compound additions are made when the halogen containing starting polymer is one normally converted to an elastomer upon vulcanization and especially when unvulcanized poly-2-chlorobutadiene is concerned. The addition of such vulcanizing agents renders it possible to produce products having an especially high modulus.

Often it is expedient to add fillers, dyes or pigments to the masses according to the invention in quantities up to 200% by weight based upon the polymer contained in the mass. All types of carbon black, such as flame black, coloring black and gas black, as well as active highly disperse and aftertreated carbon blacks, can be used as fillers. In addition, highly disperse metal or metalloid oxides, preferably silica obtained pyrogenically in the gas phase or oxides or silicates obtained by precipitation, are suitable as fillers. The use of inactive fillers alone or in combination with active fillers in some instances is of advantage. Often it is expedient to add fibrous materials, such as textile fibres, asbestos or glass fibres, either alone or together with the fillers. When improvement in appearance and color is desired it is usually only necessary to employ relatively small quantities of, for example, up to 10%, of dyes or pigments.

It was further found that the masses according to the invention could be improved further by the addition of polyethylene and/or silicone oil, expediently in quantities of 0.05 to 10% by weight based upon the halogen containing polymer content when the substances are used together, and when used separately up to 8%. Such additions, especially of the silicone oil, impart properties to the masses which upon further processing lead to softer and more pleasant hand in the synthetic leather produced therefrom, as well as greater water repellency.

The compositions according to the invention, for example, can be prepared by masticating the mixtures on a kneader or rolling mill. The various additions can be worked into the masses simultaneously or separately. The batch obtained after the mastication can then be rolled out to a sheet with the aid of a calender or be applied to a carrier. The extrusion of a strip which is then applied to a carrier is also possible.

The masticated batch can also be dissolved in a solvent and can then be applied to a carrier by spreading or dipping in a spreading or impregnating machine. Solutions can also be prepared by dissolving the halogen containing polymer in a suitable solvent in a mixer and then adding the other materials to such solution. Cross-linking is effected under the influence of heat.

In the case of the halogen containing plastomer, that is, a thermoplastic polymer of the type of polyvinyl chloride, the most usable method is to form a paste of such plastomer together with a known plasticizer, such as tricresyl phosphate, dioctyl adipate, dioctyl phthalate, dinonyl sebacate, with the addition of the other materials according to the invention. The resulting paste can then be drawn out to a sheet on a calender, be spread on a fabric or other carrier by a spreading machine, be molded in a press to plates or other shaped bodies or be extruded. In such shaping operations, heat is necessary and such heat not only engenders gelling but also cross-linking whereby the plastomer is converted into an elastomer under the synergistic action of the combination of cross-linking agents employed.

The temperature employed for effecting cross-linking or vulcanization of the compositions according to the invention cannot exceed certain limits. In general, temperatures between 80 and 220° C. should be used to effect the cross-linking. A special advantage of compositions according to the invention is that the starting polymers can be cross-linked in a very short period of time. For example, only 1 to 2 minutes are required at 165° C. to effect cross-linking of a composition containing polyvinyl chloride.

When the compositions according to the invention are of a halogen containing polymer normally producing an elastomer on vulcanization, it is preferable that the cross-linking or vulcanization is effected at temperatures not over 150° C. Expediently, temperatures between 80 and 140° C. can be used. In the case of poly-2-chlorobutadiene the vulcanization can be effected in about 90–120 seconds at 140° C.

Some of the compositions according to the invention can be treated at higher temperatures to effect the cross-linking. For example, when they contain halogen containing plastomers, such as polyvinyl chloride, polyvinylidene chloride or the copolymers of vinyl chloride and vinylidene chloride, the cross-linking can be effected at temperatures up to 220° C., preferably at temperatures between 120 and 200° C.

When solutions of the masses according to the invention are concerned the cross-linking only takes place after evaporation of the solvent. The cross-linking can be accelerated by the supply of heat within the temperature ranges indicated above.

The properties of the compositions according to the invention can be varied to a great extent depending upon the halogen-containing polymeric material selected and the additions thereto. They can, for example, be employed for the production of sheets, tubes, wire insulation, shaped bodies, protective clothing, upholstery materials, automobile tops and the like.

The following examples will serve to illustrate a number of embodiments of the invention. In such examples the proportions are given in parts by weight unless otherwise specified.

Example 1

| | Parts |
|---|---|
| Poly-2-chlorobutadiene | 100 |
| Active carbon | 35 |
| Active zinc oxide | 6 |
| Magnesium oxide | 4 |
| Petroleum jelly | 1 |
| Polyethylene (M.P. 90–92° C.) | 5 | were masticated together in a rubber processing mill in 10 minutes and pulled out to a sheet. This sheet was then dissolved or respectively suspended in a stirrer in 100 parts of a mixture of 50 parts benzene, 25 parts ethyl acetate and 25 parts mineral spirits. Then 10 parts of a solution composed of 30 parts of the Schiff's base of hexamethylene diamine and benzaldehyde in 70 parts benzene were added to this solvent mixture. Thereafter, 8 parts of a 75% solution of toluylene diisocyanate in ethyl acetate were stirred into the mixture and the mass used to coat a textile fabric at room temperature. The solvent was driven off from the coating by heating to 100° C. in 90 seconds. Thereafter the temperature was raised to 140° C. for 2 minutes. The coating mass was vulcanized and was then cooled down.

Example 2

100 parts of chloro sulfonated polyethylene
5 parts silica produced pyrogenically in the gas phase
30 parts chalk
30 parts titanium dioxide
15 parts magnesium oxide
10 parts polyethylene
2 parts petroleum jelly
0.5 part silicon oil—M.P. —55° C. density 0.988/25° C., refractive index 1.403/25° C.
5 parts Schiff's base of ethylene diamine and acetoacetic acid ester
5 parts methylene-bis-(4-phenyl-isocyanate)

were kneaded together for 5 minutes in a Banbury-mixer and the mixture thus obtained drawn out to a sheet on a calender. The sheet was then directly calendered on a fabric while it still was hot and plastic. The vulcanization of the mass was achieved by heating the calender rolls to 146° C. Subsequent heating was not necessary even though the vulcanization of the mass leaving the calender rolls had not reached the desired degree, as the vulcanization reaction initiated will go to completion depending upon the quantity of reaction substances added.

The properties of the sheets and synthetic leathers produced in Examples 1 and 2 were investigated and compared with those of products prepared from the same compositions but omitting both or only one of the additives according to the invention, namely, (1) the isocyanate and (2) the Schiff's base and/or dimethylol compounds. The results in such tests are given in Table 1 below in which column (a) gives the results with the basic composition without both additions, column (b) gives those of the basic composition with isocyanate only, column (c) those of the basic composition with Schiff's base only and column (d) gives those of the basic composition with both the isocyanate and Schiff's base of Examples 1 and 2 respectively.

The quantity of the cross-linking agent or agents employed in the compositions for the tests reported in columns (b), (c) and (d) were such that in each instance the sum of the groups capable of cross-linking in the cross-linking agents (in grams) was always equivalent.

TABLE 1

| | (a) | (b) | (c) | (d) |
|---|---|---|---|---|
| Tear resistance of coating film in kg./cm.²: | | | | |
| Example 1 | 55.85 | 88.7 | 108.3 | 111.85. |
| Example 2 | 22 | 39.6 | 23.8 | 68.6. |
| Extension of film in percent: | | | | |
| Example 1 | 770 (flowed) | 525 | 300 | 330. |
| Example 2 | Flowed, not measurable. | 425 | Not measurable | 250. |
| Adhesion to polyester fabric (1000 den., 10 x 10 weave) in kg. per 5 cm. width (DIN 53357): | | | | |
| Example 1 | 3.55 | 6.65 | 6.6 | 11.3. |
| Example 2 | 4.8 (film tore in middle). | 13 | 10.2 (film partly tore in middle). | 30 (not measured exactly as film tore above 30 kg.). |
| Solubility of coating film in xylene: | | | | |
| Example 1 | Soluble | Insoluble | Slightly soluble | Insoluble. |
| Example 2 | Soluble | Insoluble | Soluble | Insoluble. |

Example 3

(a) 20 parts of lead oxide were masticated into 100 parts of polytetrafluoroethylene with the aid of a rubber processing mill at room temperature. After the lead oxide had been mixed in the mastication was continued for a further 5 minutes. A plate $Pa\ 1$ 1 mm. thick was pressed from the resulting batch at 220° C. for 2 hours. A second plate $Pa\ 2$ also 1 mm. thick was pressed from such batch at 220° C. for only 10 minutes.

(b) The procedure of (a) was repeated except that in addition 2.5 parts of di-benzal-hexamethylene diamine and 2.0 parts of dimethylol piperazine were masticated into the rubber batch.

Two plates $Pb\ 1$ and $Pb\ 2$ were prepared under the same conditions as in (a).

(c) The procedure of (a) was repeated except that in addition 4.0 parts of toluylene-diisocyanate were masticated into the rubber batch.

Two plates $Pc\ 1$ and $Pc\ 2$ were prepared under the same conditions as in (a).

(d) The procedure of (a) was again repeated except that in addition the additional substances added in both (b) and (c) were masticated into the rubber batch.

Two plates $Pd\ 1$ and $Pd\ 2$ were prepared under the same conditions as in (a).

The following test values were obtained from such plates.

TABLE 2

| Testing according to DIN 53504 | (a) | | (b) | | (c) | | (d) | |
|---|---|---|---|---|---|---|---|---|
| | Pa 1 | Pa 2 | Pb 1 | Pb 2 | Pc 1 | Pc 2 | Pd 1 | Pd 2 |
| Tearing strength, kg./cm.² | 64 | 48 | 79 | 72 | 73 | 67 | 106 | 104 |
| Elongation percent | ¹330 | (¹) | 585 | ¹615 | 410 | ¹400 | 625 | 630 |

¹ The force-elongation curve indicated that the material of the plate in question underwent plastic flow.

Mixtures produced according to (a) through (d) were after completion of the mastication applied to an asbestos fibre glass fibre mixed fabric at 220° C. with the aid of a heatable laminating apparatus. The adhesion of the heated film to the fabric for a width of 5 cm. in kg. was as follows: (a)=2.08; (b)=4.3; (c)=4.9; (d)=10.4.

A comparison of the values obtained, especially for the tear strengths and adhesion, show the very superior properties of the composition (d) according to the invention. The values obtained with (d) surpass the sum of those obtained with (b) and (c) when they are compared with those of (a) (control).

The synergistic effects attained with the compositions according to the invention are especially valuable when coating masses are to be adhered to fabrics, especially to the so-called fully synthetic fabrics (polyamide, polyester and the like), for instance, in the production of upholstery materials and automobile tops.

The results with 3(d) are representative for those of compositions based on polymers of tetrafluoroethylene, monochlorotrifluoroethylene, trifluoroethylene, dichlorodifluoroethylene and difluorochloroethylene and copolymers containing at least 20% by weight of such monomers with other comonomers.

*Example 4*

A basic composition was prepared by mixing:

66.5 parts of polyvinyl chloride (K value=70)
28.5 parts dioctyl phthalate
2.0 parts chalk
0.3 part titanium dioxide
1.5 parts aluminum oxide produced pyrogenically in the gas phase
1.0 part dibutyl tin maleate in a rubber processing mill until uniform distribution of the ingredients was attained. Then 2.48 parts of the Schiff's base obtained from cinnamic aldehyde and octamethylene diamine (A) and/or 1.145 parts of hexamethylenediisocyanate (B) were worked into such mixture individually in equivalent quantities and the resulting masses processed on a calender at 180° C. to form sheets.

The following table compares the tearing strength, elongation, and solubility (24 hours in equal quantities cyclohexanone and tetrahydrofurane) of sheets of the basic composition without additions, sheets of such composition with addition of A, sheets of such composition with addition of B and sheets of such composition with addition of A and B.

TABLE 3

| Additions to basic composition in parts by weight | None | 4.95 parts A (≈7.44% ≈2/100 mol with reference to PVC) | 2.29 parts B (≈3.44% ≈2/100 mol with reference to PVC) | 2.48 parts A (≈3.72% ≈1/100 mol) and 1.145 parts B (≈1.72% ≈1/100 mol) |
|---|---|---|---|---|
| Tearing strength kg./cm² | 260 | 279 | 254 | 287 |
| Elongation in percent | 250 | 260 | 255 | 300 |
| Solubility | Soluble | Insoluble | Soluble | Insoluble |

The synergistic action of the combination of cross-linking agents according to the invention is clearly discernable from the values given in such table. The composition containing such combination is specially adapted as a coating composition for fabrics.

This example is representative for homopolymers of vinyl chloride, vinylidene chloride and vinyl fluoride and copolymers containing at least 20% by weight of components corresponding to such monomers with other comonomers such as have been described previously in the specification and particularly vinyl esters such as vinyl acetate and vinyl propionate, maleic acid esters, fumaric acid esters, vinyl alcohols, vinyl ethers, vinyl amines, vinyl acetylene and the like.

In the Example 2 the chloro sulfonated polyethylene may be replaced by the chlorosulfonated polypropylene or the chloro sulfonated copolymer of ethylene and propylene.

We claim:

1. A halogenated thermoplastic composition comprising
   (A) a thermoplastic halogen-containing polymeric component composed of at least one thermoplastic halogen-containing polymer obtained from a halogenated organic monomer in which the halogen is selected from the group consisting of chlorine and fluorine,
   (B) 0.01 to 8% by weight of at least one organic oligo isocyanate having 2–5 functional —N=CO groups and
   (C) 0.01 to 15% by weight of at least one nitrogen containing organic compound selected from the group consisting of
      (1) oligo Schiff's bases having 2–5 functional >C=N— groups,
      (2) oligo methylols of oligo amines with an average of not more than one methylol group on any individual nitrogen atom having 2–5 functional —CH$_2$OH groups and (3) oligo methylols of oligo carboxylic acid amides with an average of not more than one methylol group on any individual nitrogen atom having 2–5 functional —CH$_2$OH groups, all percentages being with reference to the themoplastic halogen-containing polymeric component.

2. The composition according to claim 1 comprising in addition 0.05 to 8% by weight of polyethylene with reference to the thermoplastic halogen-containing thermoplastic component.

3. The composition according to claim 1 comprising in addition 0.05 to 8% by weight of silicon oil with reference to the thermoplastic halogen-containing thermoplastic component.

4. The composition according to claim 1 in which said thermoplastic halogen-containing polymeric component is polyvinyl chloride.

5. The composition according to claim 1 in which said thermoplastic halogen-containing polymeric component is poly-2-chlorobutadiene.

References Cited by the Examiner

UNITED STATES PATENTS

| | | | |
|---|---|---|---|
| 2,491,102 | 12/1949 | Frowde | 260—853 |
| 2,500,517 | 3/1950 | Carswell | 260—852 |
| 2,593,582 | 4/1952 | Lontz et al. | 260—29.1 |
| 2,792,309 | 5/1957 | Teichmann | 260—29.1 |
| 2,867,608 | 1/1959 | Landrum et al. | 260—878 |
| 2,871,213 | 1/1959 | Graulich et al. | 260—853 |
| 2,897,176 | 7/1959 | Rocky et al. | 260—897 |
| 3,085,082 | 4/1963 | Baer et al. | 260—889 |

FOREIGN PATENTS

| | | |
|---|---|---|
| 1,013,067 | 8/1957 | Germany. |
| 1,066,686 | 10/1959 | Germany. |

MORRIS LIEBMAN, *Primary Examiner.*

L. T. JACOBS, *Assistant Examiner.*